US012803150B2

(12) United States Patent
Zheng et al.

(10) Patent No.: US 12,803,150 B2
(45) Date of Patent: Nov. 17, 2026

(54) RESONANCE ELEMENT, A ONE-PIECE RESONANCE MEMBER AND A CAVITY FILTER

(71) Applicant: Telefonaktiebolaget LM Ericsson (publ), Stockholm (SE)

(72) Inventors: Jun Zheng, Beijing (CN); Xueyuan Zhang, Beijing (CN); Weidong Wang, Beijing (CN); Lei Sun, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 92 days.

(21) Appl. No.: 18/725,338

(22) PCT Filed: Dec. 28, 2021

(86) PCT No.: PCT/CN2021/142130

§ 371 (c)(1),
(2) Date: Jun. 28, 2024

(87) PCT Pub. No.: WO2023/122974

PCT Pub. Date: Jul. 6, 2023

(65) Prior Publication Data

US 2025/0079681 A1 Mar. 6, 2025

(51) Int. Cl.
*H01P 7/00* (2006.01)
*H01P 1/207* (2006.01)

(52) U.S. Cl.
CPC ................ *H01P 7/00* (2013.01); *H01P 1/207* (2013.01)

(58) Field of Classification Search
CPC ............... H01P 7/00; H01P 1/207; H01P 7/04
(Continued)

(56) References Cited

U.S. PATENT DOCUMENTS

2019/0157731 A1 5/2019 Miyamoto
2020/0176842 A1 6/2020 Miyamoto et al.
(Continued)

FOREIGN PATENT DOCUMENTS

CN 1089759 A 7/1994
CN 103117433 A 5/2013
(Continued)

OTHER PUBLICATIONS

International Search Report and Written Opinion for International Patent Application No. PCT/CN2021/142130, mailed Sep. 7, 2022, 11 pages.
(Continued)

*Primary Examiner* — Jorge L Salazar, Jr.
(74) *Attorney, Agent, or Firm* — Withrow & Terranova, PLLC

(57) ABSTRACT

The present disclosure relates to a resonance element for a cavity filter, the resonance element made of a metal sheet and comprising a planar portion to be positioned facing a first inner side of a resonance cavity of the cavity filter and an elongate supporting portion extending from the planar portion towards the second inner side of the resonance cavity opposite to the first inner side and connected therewith in a grounding state, wherein the planar portion is configured to be substantially in an E-shape, an F-shape, an L-shape or a T-shape when viewed along a direction perpendicular to a plane of the planar portion. The present disclosure also relates to a one-piece resonance member comprising the above resonance element and a cavity filter comprising the above-said resonance element and/or the above-said one-piece resonance member.

17 Claims, 16 Drawing Sheets

(58) Field of Classification Search
USPC .................................................. 333/219, 224
See application file for complete search history.

(56) References Cited

U.S. PATENT DOCUMENTS

| | | | | |
|---|---|---|---|---|
| 2021/0028525 | A1 | 1/2021 | Iwanaka | |
| 2021/0226310 | A1 | 7/2021 | Jia et al. | |
| 2022/0190455 | A1* | 6/2022 | Jia | H01P 7/04 |
| 2023/0121638 | A1* | 4/2023 | Kim | H01P 11/007<br>343/893 |

FOREIGN PATENT DOCUMENTS

| | | | |
|---|---|---|---|
| CN | 103311616 | A | 9/2013 |
| CN | 107331927 | A | 11/2017 |
| CN | 107706490 | A | 2/2018 |
| CN | 108493538 | A | 9/2018 |
| CN | 208986148 | U | 6/2019 |
| CN | 111786069 | A | 10/2020 |
| CN | 112514156 | A | 3/2021 |
| CN | 113113743 | A | 7/2021 |
| CN | 113193319 | A | 7/2021 |
| WO | 2020200318 | A1 | 10/2020 |

OTHER PUBLICATIONS

Extended European Search Report for European Patent Application No. 21969353.8, mailed Jul. 29, 2025, 8 pages.

* cited by examiner

RESONANCE ELEMENT, A ONE-PIECE RESONANCE MEMBER AND A CAVITY FILTER

This application is a 35 U.S.C. § 371 national phase filing of International Application No. PCT/CN2021/142130, filed Dec. 28, 2021, the disclosure of which is incorporated herein by reference in its entirety.

TECHNICAL FIELD

The present disclosure generally relates to the technical field of a filter and, more particularly, to a resonance element, and a resonance member and a cavity filter comprising the resonance element or the resonance member.

BACKGROUND

This section introduces aspects that may facilitate better understanding of the present disclosure. Accordingly, the statements of this section are to be read in this light and are not to be understood as admissions about what is in the prior art or what is not in the prior art.

With the development of 5G communication technology, MIMO (multiple-input and multiple-output) technology is widely used, which requires a lot of filter units (FUs) to be integrated with an antenna unit (AU) or a radio unit (RU). For saving cost and space, FUs are usually soldered onto a radio mother board, a low pass filter (LPF) board, an antenna calibration (AC) board or a power splitter board, which means smaller and lighter FUs are quite in demand. Additionally, the power required by a FU is reduced. Thus, filers that are smaller and lighter with better performance will be more welcome.

In the traditional solution, both CWG (ceramic waveguide) filter and metal filter are used widely. Due to the insufficient reliability of the CWG, the metal filter attracts more attention now, although it has the disadvantages of having a big size and weight for an optimal Q value.

Also, another problem with existing metal filters is that their tuning is not very sensitive and there is difficulty in reducing the frequency, for example, to 2.5 GHz.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The present disclosure aims to provide a resonance element or a resonance member which is able to make tuning more sensitive and thus allow optimization of Q value and frequency reduction.

According to a first aspect of the disclosure, there is provided a resonance element for a cavity filter, the resonance element made of a metal sheet and comprising a planar portion to be positioned facing a first inner side of a resonance cavity of the cavity filter and an elongate supporting portion extending from the planar portion towards the second inner side of the resonance cavity opposite to the first inner side and connected therewith in a grounding state. The planar portion is configured to be substantially in an E-shape, an F-shape, an L-shape or a T-shape when viewed along a direction perpendicular to a plane of the planar portion.

In an embodiment of the disclosure, the resonance element is bent from the metal sheet along a line in its plane to have the planar portion and the elongate supporting portion.

In an embodiment of the disclosure, a middle leg of the E shape, a middle leg of the F shape, a leg of the L shape or a central leg of the T shape and the elongate supporting portion come from a strip-shaped portion of the metal sheet.

In an embodiment of the disclosure, at least one side leg of the E shape has a first dropping planar part extending towards the second inner side of the resonance cavity.

In an embodiment of the disclosure, the first dropping planar part is formed by bending corresponding part of the metal sheet at an end of corresponding side leg of the E shape.

In an embodiment of the disclosure, a side leg of the F shape has a first dropping planar part extending towards the second inner side of the resonance cavity.

In an embodiment of the disclosure, the first dropping planar part is formed by bending corresponding part of the metal sheet at an end of the side leg of the F shape.

In an embodiment of the disclosure, a tail end of the F shape has a second dropping planar part extending towards the second inner side of the resonance cavity.

In an embodiment of the disclosure, the second dropping planar part is formed by bending corresponding part of the metal sheet at the tail end of the F shape.

In an embodiment of the disclosure, a strip-shaped base of the L shape has a second dropping planar part provided at its end away from the elongate supporting portion and extending towards the second inner side of the resonance cavity.

In an embodiment of the disclosure, the second dropping planar part is formed by bending corresponding part of the metal sheet at corresponding end of the strip-shaped base of the L shape.

In an embodiment of the disclosure, at least one end of a head part of the T shape has a second dropping planar part extending towards the second inner side of the resonance cavity.

In an embodiment of the disclosure, the second dropping planar part is formed by bending corresponding part at corresponding end of the head part of the T shape.

In an embodiment of the disclosure, a folded part is provided at an end of the second dropping planar part far away from a main body of the planar portion and extends beneath and parallel to a plane of the main body of the planar portion.

In an embodiment of the disclosure, the folded part is formed by bending corresponding part of the metal sheet at corresponding end of the second dropping planar part.

In an embodiment of the disclosure, the planar portion has a third dropping planar part extending on a lateral side of a main body of the planar portion opposite to another lateral side from which the elongate supporting portion extends, towards the second inner side of the resonance cavity.

In an embodiment of the disclosure, the third dropping planar part is formed by bending corresponding part of the metal sheet on corresponding lateral side of the main body of the planar portion.

In an embodiment of the disclosure, the third dropping planar part extends partially or fully along the corresponding lateral side of the main body of the planar portion.

In an embodiment of the disclosure, an outward-facing main surface of the elongate supporting portion that extends at an angle from a planar surface of the planar portion facing the first inner side of the resonance cavity is configured as a tuning surface cooperating with a tuning screw.

According to a second aspect of the disclosure, there is provided a one-piece resonance member made from a metal sheet, comprising at least two above-said resonance elements, wherein the resonance elements are made from one and the same metal sheet and are connected in a row via a common planar connection bar which is formed from the same metal sheet and extends in the same plane as the elongate supporting portions of the resonance elements.

In an embodiment of the disclosure, the planar portions of resonance elements, when viewed along a direction perpendicular to the plane of the planar portions, are in an E shape, F-shaped, L-shaped or T-shaped, oriented in the same direction.

According to a third aspect of the disclosure, there is provided a cavity filter comprising one above-said resonance element and/or one-piece resonance member disposed in its resonance cavity.

In an embodiment of the disclosure, a tuning screw is inserted into a region in proximity to or partially surrounded by an outward-facing main surface of an elongate supporting portion that extends at an angle from a planar surface of corresponding planar portion facing the first inner side of the resonance cavity.

With the resonance element or the resonance member of the present disclosure, frequency can be easily reduced due to its great sensitivity in tuning. Also, it benefits in terms of production tuning and improved Q value and low insertion loss.

Also, the resonance element or member can be easily produced by a sheet metal processing method (for example, by stamping). The processing cost is lower than that for a traditional coaxial resonator. The design of the resonance member enables connecting two cavities by a single one-piece member made from a common sheet metal, for example, by one-step stamping, and allows to achieve high coupling consistency between the two cavities.

By the cavity filter of the present disclosure, it is possible to achieve a smaller and lighter design, in which the second harmonic is far away and good out-of-band attenuation performance may be obtained.

Additionally, the cavity filter of the present disclosure can be flexibly designed and assembled with high efficiency. Due to the benefit in both production consistency and accuracy, production efficiency can be improved with production cost being reduced.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

The embodiments of the present disclosure are described in detail with reference to the accompanying drawings. It should be understood that these embodiments are discussed only for the purpose of enabling those skilled in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. Those skilled in the relevant art will recognize that the disclosure may be practiced without one or more of the specific features or advantages of a particular embodiment. In other instances, additional features and advantages may be recognized in certain embodiments that may not be present in all embodiments of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 1:
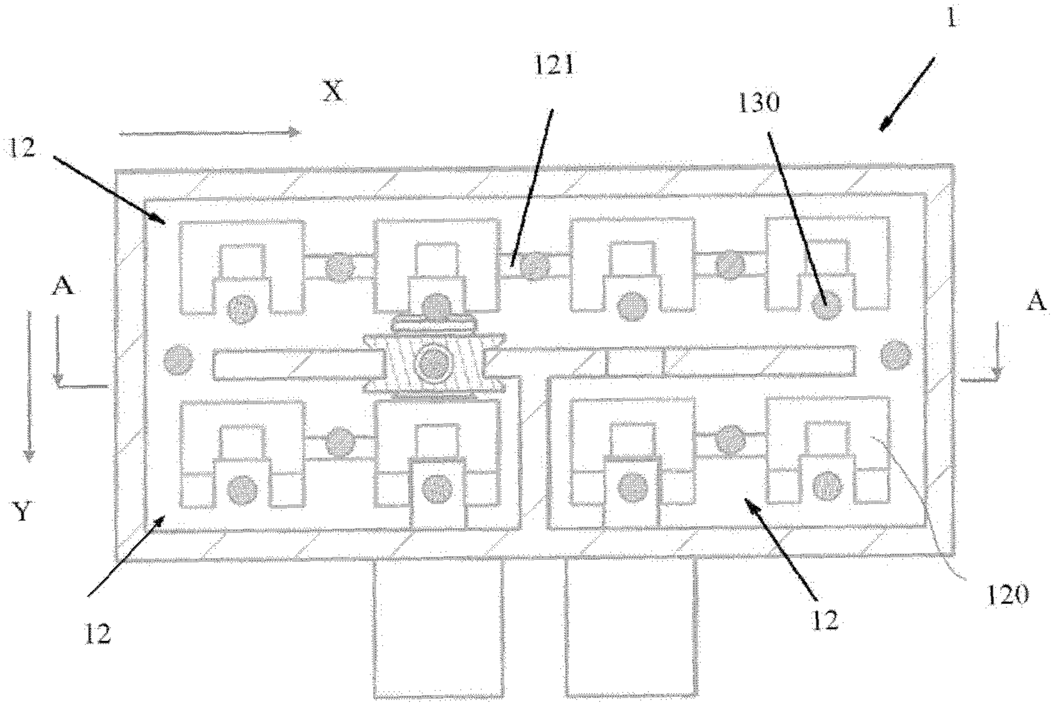
FIG. 1 is a plan view of a cavity filter, with a cover plate being removed to clearly show a resonance element or a resonance member of the present disclosure.
Figure 2:
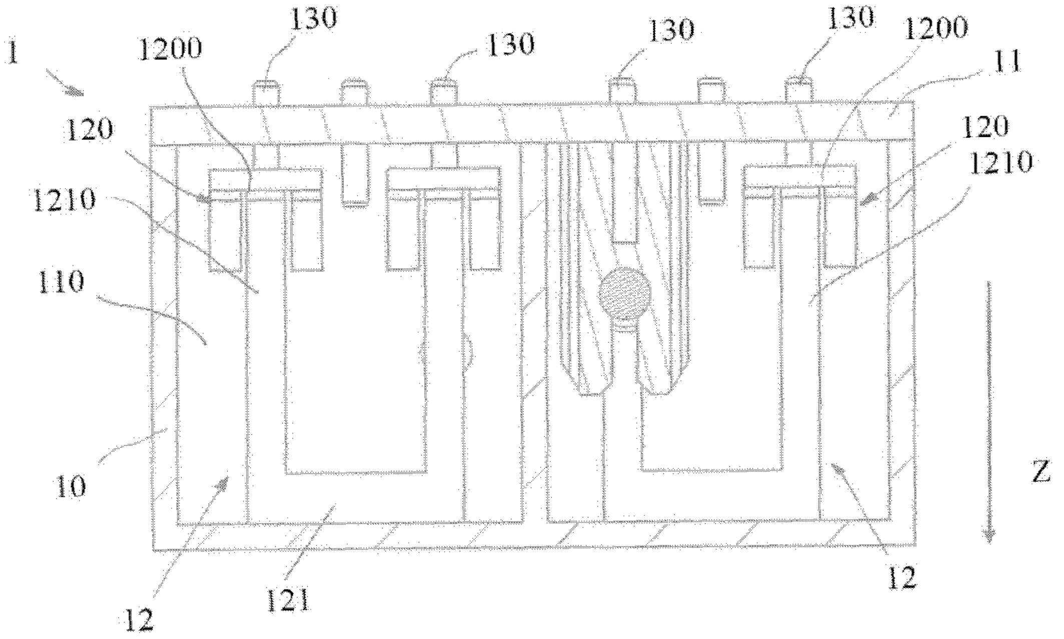
FIG. 2 is a cross sectional view of the cavity filter of FIG. 1 taken along the line A-A.
Figure 3A:
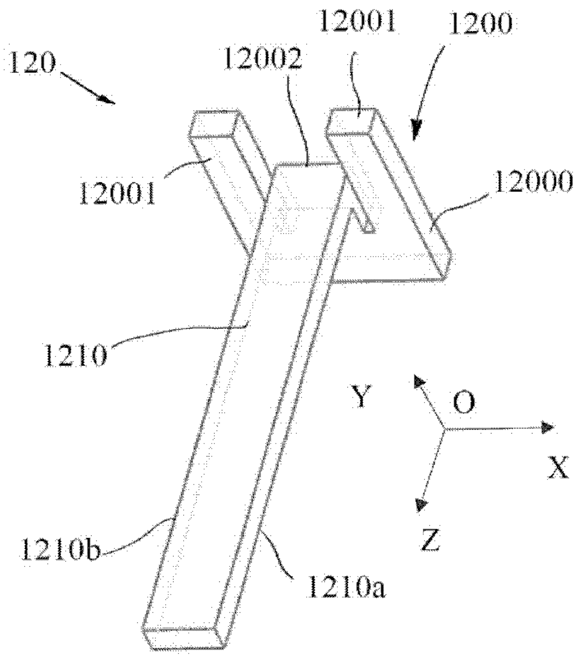
FIGS. 3A, 3B, 3C and 3D show a perspective view, a front view, a bottom view and a side view of a first variant of a resonance element according to a first embodiment of the present disclosure.
Figure 3B:
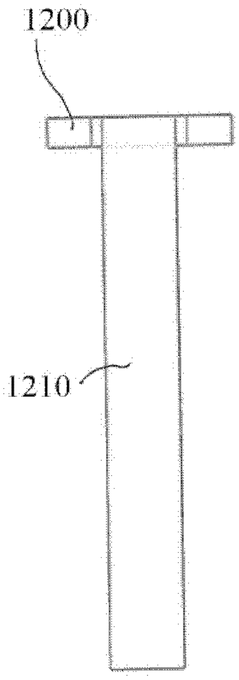
Figure 3C:
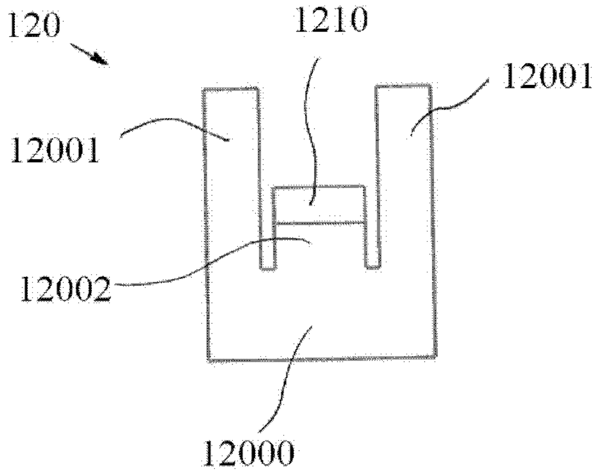
Figure 3D:
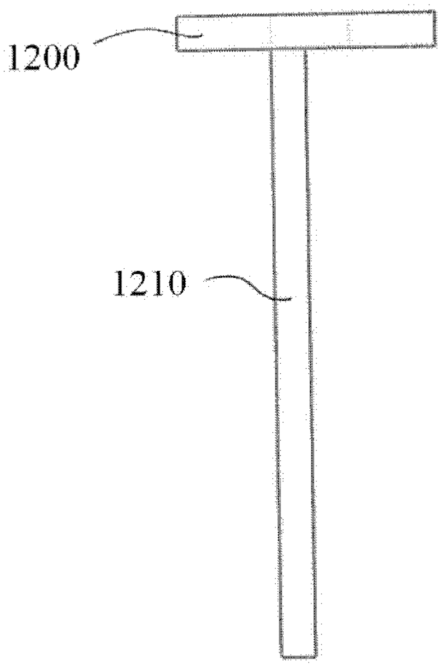
Figure 4A:
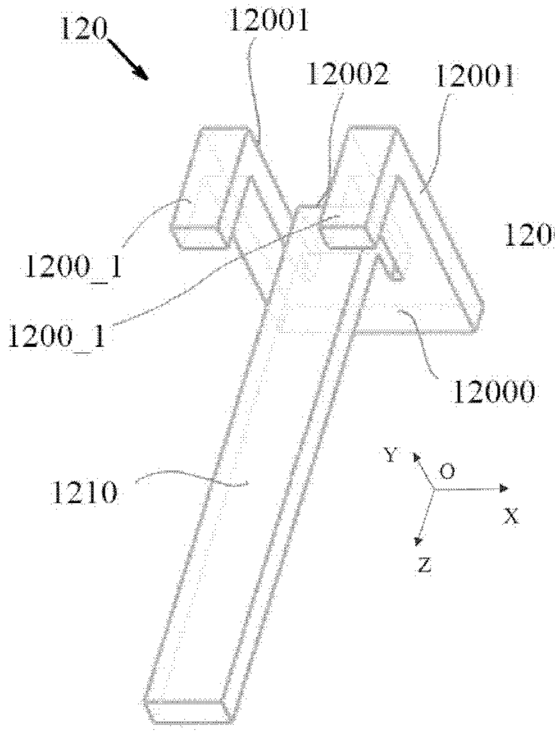
FIGS. 4A, 4B, 4C and 4D show a perspective view, a front view, a bottom view and a side view of a second variant of a resonance element according to the first embodiment of the present disclosure.
Figure 4B:
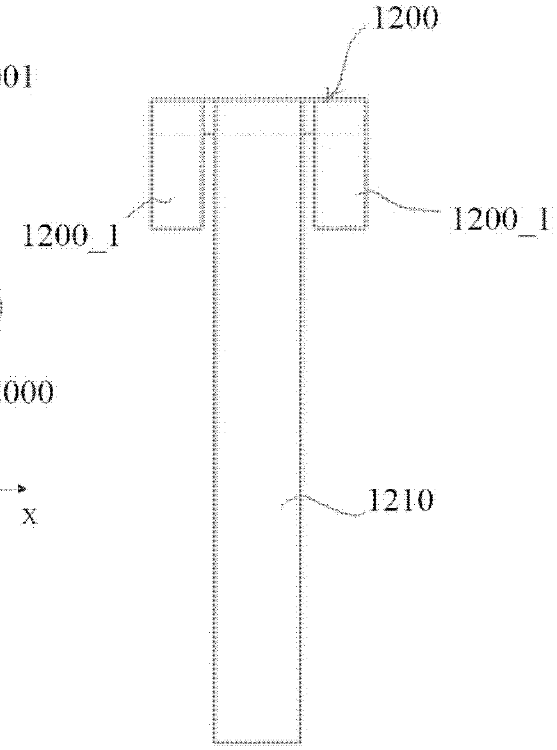
Figure 4C:
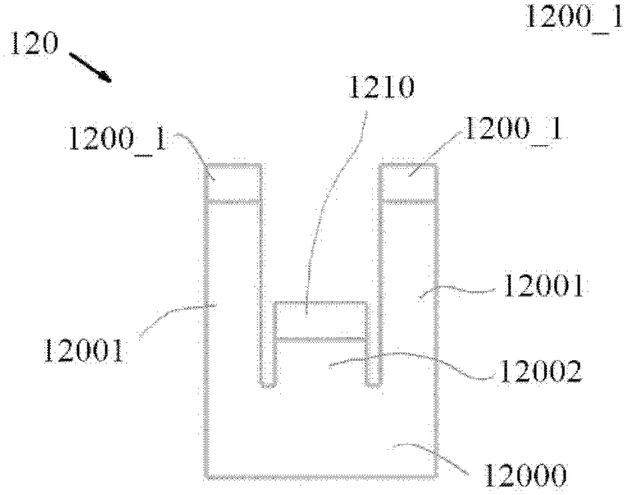
Figure 4D:
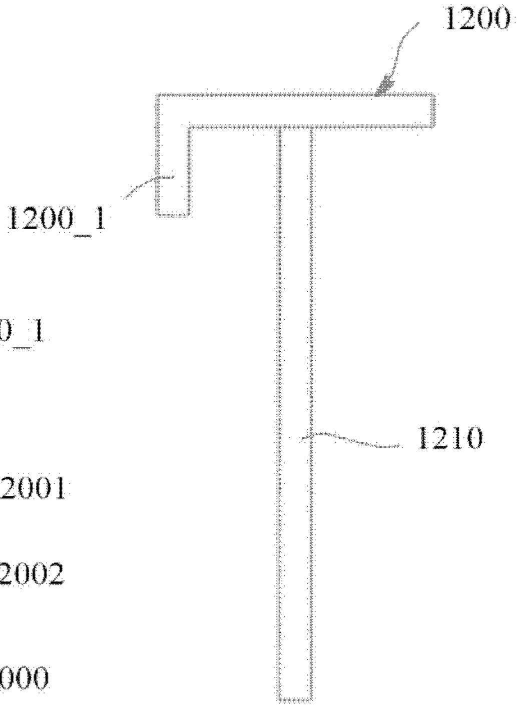
Figure 5A:
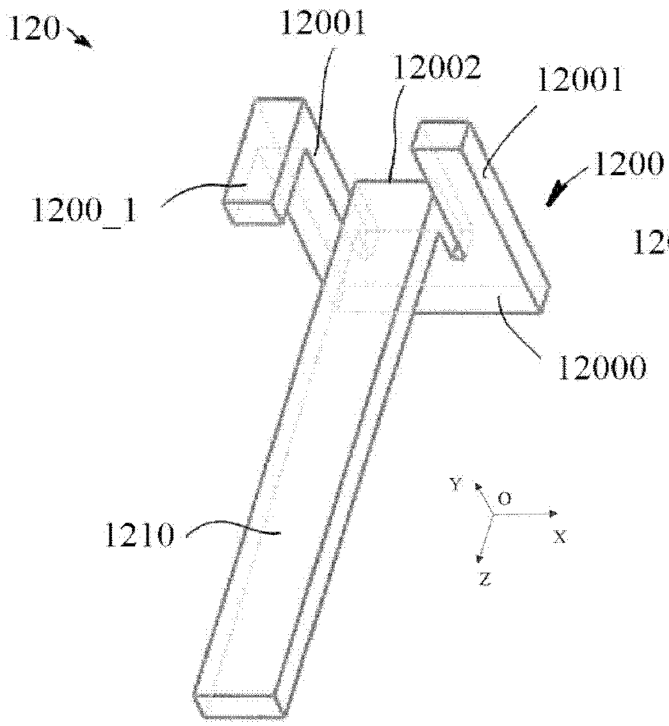
FIGS. 5A, 5B, 5C and 5D show a perspective view, a front view, a bottom view and a side view of a third variant of a resonance element according to the first embodiment of the present disclosure.
Figure 5B:
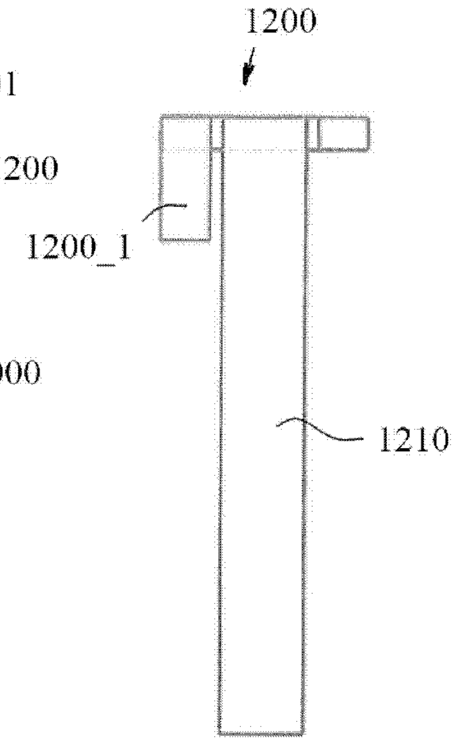
Figure 5C:
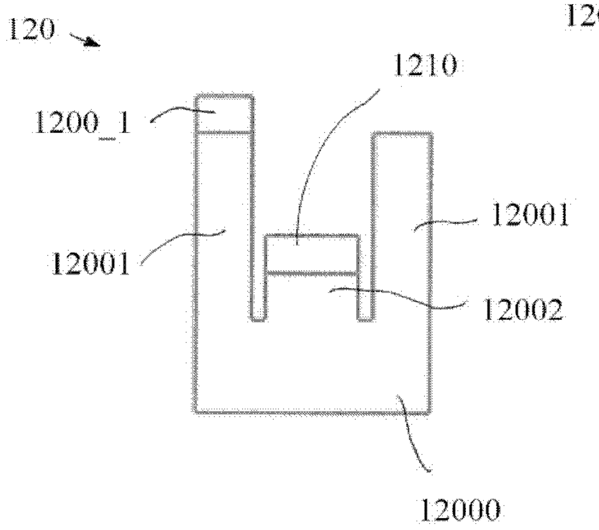
Figure 5D:
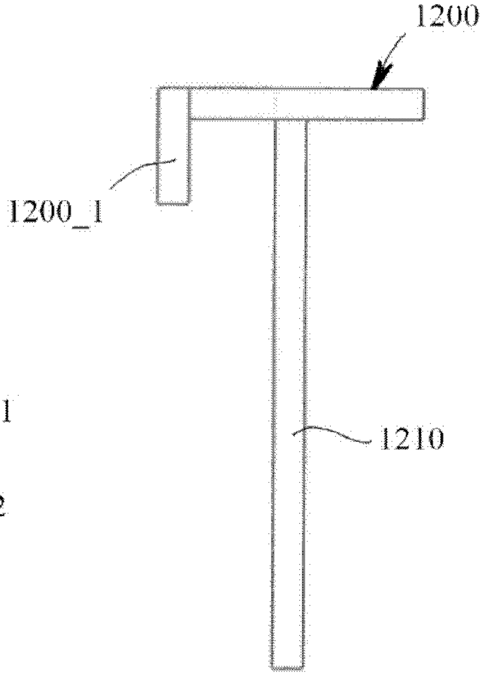

FIG. 1 shows a plan view of a cavity filter 1 of the present disclosure, with its cover plate 11 being removed to show the arrangement of the resonators provided therein. FIG. 2 shows some resonators in a cross-sectional view taken along the line A-A in FIG. 1.

The cavity filter 1 mainly includes an opened cavity body 10, a cover plate 11 placed on the cavity body, and resonators arranged in a resonance cavity 110 defined by the cavity body 10 and the cover plate 11. By means of the cavity filter, a radio frequency signal is filtered by capacitive coupling between multiple resonators to obtain a desired frequency band.

As shown in FIGS. 1-2, the resonators are embodied in the form of one-piece resonance members 12 comprising several resonance elements 120 arranged at intervals along a common planar connection bar 121. All the resonance members 12 are connected to the bottom of the resonance cavity 110 in a grounding state. Each resonance element 120 is integrally made from a metal sheet, for example, by a sheet metal processing method, to have a sheet-like planar portion 1200 and a sheet-like elongate supporting portion 1210. The planar portion 1200 is arranged such that it extends substantially in parallel with the inner side of the cover plate 11, having its upper planar side face the inner side of the cover plate 11 and spaced therefrom by a certain distance along the z direction. The elongate supporting portion 1210 extends from the planar portion 1200 along the z direction and is connected to the bottom of the resonance cavity 110 via a connection bar for example by welding so that the elongate supporting portion 1210 is put into a state of grounding connection. The sheet-like elongate supporting portion 1210 functions also as a support for the entire planar portion 1200.

Tuning screws 130 are provided on the cover plate in areas corresponding to the planar portions 1200 of resonance elements 120, and protrude into the resonance cavity 110 along the z direction. The protrusion length of the tuning screws 130 can be adjusted so as to change the capacitance between the tuning screws 130 and the resonance elements 120 and thus to have frequency of the cavity filter adjusted as desired.

Although the cavity filter shown in FIGS. 1 and 2 has resonators embodied as resonance members 12 only, it can be understood that in some embodiments, one or more resonance elements 120 and/or one or more resonance members 12 may be arranged in the resonance cavity 110 of the cavity filter 1.

Resonance Element

As shown in FIGS. 1 and 2, the resonance element 120 is a basic unit for constituting a resonance member 12. Hereinbelow, different variants of resonance elements 120 are described in detail.

According to the present disclosure, a metal sheet is bent along an imaginary line in its plane so as to have the planar portion 1200 and the elongate supporting portion 1210 formed. The x-o-y plane where the planar portion 1200 extends is substantially perpendicular to the x-o-z plane where the elongate supporting portion 1210 extends. The planar portion 1200 may be further bent or folded to be like a bracket or a frame, but always comprises a main body extending in the x-o-y plane and having its planar side face an inner side of the resonance cavity of the cavity filter through which a tuning screw penetrates in the z direction. The planar portion 1200 is substantially in an E-shape, an F-shape, an L-shape or a T-shape when viewed along a direction perpendicular to a plane of the planar portion or of the main body of the planar portion.

E-Shaped Planar Portion in a Top View

A First Variant of the Planar Portion

As shown in FIGS. 3A-3D, the planar portion 1200 of the resonance element 120 is configured to be in an E shape when viewed along the z direction. Especially referring to FIG. 3C, the E shape comprises a strip-shaped base 12000 extending in the x direction and three legs extending in the y direction from the same lateral side of strip-shaped base. Among the three legs, two side legs 12001 each are provided on an end of the strip-shaped base 12000 and one middle leg 12002 is located between the two side legs. The strip-shaped base 12000 and the three legs extend in the same x-o-y plane and constitute the main body of the planar portion as a whole. In the embodiment shown, the section of the planar portion 1200 that is corresponding to the middle leg of the E shape comes from the same metal sheet for the elongate supporting portion 1210. That is, a strip-shaped portion of the metal sheet is bent along a line in its plane to have one segment used as the middle leg 12002 of the E shape and the other segment used as the elongate supporting portion 1210.

In the embodiment as shown, an angle area is defined by an inward-facing main surface 1210*a* (extending in the x-o-z plane) of the elongate supporting portion 1210 and the lower planar surface (extending in the x-o-y plane) of the main body of the planar portion 1200. An outward-facing main surface 1210*b* (extending in the x-o-z plane) of the elongate supporting portion 1210 that is opposite to the inward-facing main surface extends at a right angle from an upper planar surface of the planar portion 1200. The outward-facing main surface 1210*b* of the elongate supporting portion 1210 extends between the sections of the planar portion that are corresponding to the side legs 12001 of the E shape, thus forming a recessed region into which a tuning screw is inserted from the cover plate. At least three side walls of the recessed region enable coupling with the tuning screw inserted therein, therefore increasing the sensitivity in tuning.

A Second Variant of the Planar Portion

Different from the first variant of the planar portion, the second variant of the planar portion 1200 has a leg dropping planar part (a first dropping planar part) 1200_1 provided on at least one side leg 12001 of the E shape. The leg dropping planar part 1200_1 extends in the z direction and looks like a sheet-like vertical leg hanging from the plane of the E-shaped sheet-like main body of the planar portion. The leg dropping planar part 1200_1 is formed, for example, by bending corresponding part of the metal sheet at an end of corresponding side leg 12001 of the E shape towards the bottom of the resonance cavity.

Although it is shown in FIGS. 4A-4D that there is a leg dropping planar part 1200_1 provided on each of the side legs of the E shape, it could be understood that only one of the side legs of the E shape has a leg dropping planar part 1200_1, as shown in FIGS. 5A-5D.

With the leg dropping planar parts 1200_1 of the resonance element 120, additional surfaces are provided for coupling with surrounding walls of the resonance cavity, thus allowing effectively reducing the frequency of a single cavity associated therewith, for example, to 2.5 GHz and therefore the size of the cavity filter as well.

A Third Variant of the Planar Portion

Figure 6A:
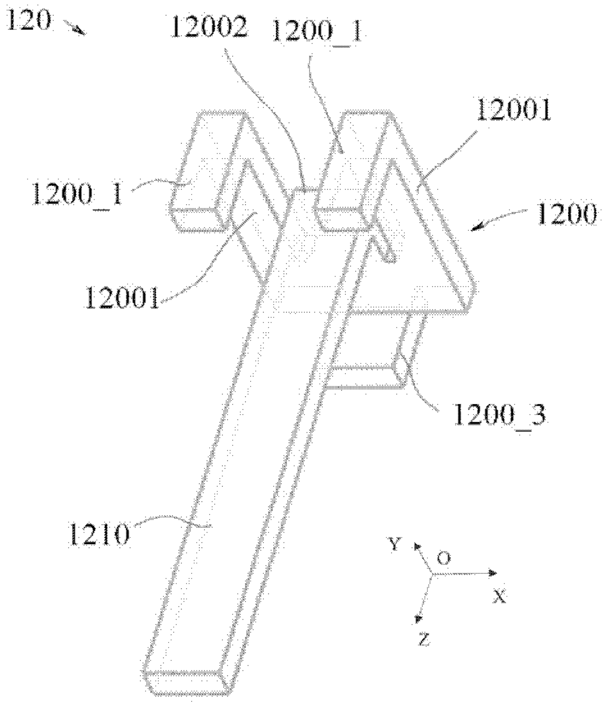
FIGS. 6A, 6B, 6C and 6D show a perspective view, a front view, a bottom view and a side view of a fourth variant of a resonance element according to the first embodiment of the present disclosure.
Figure 6B:
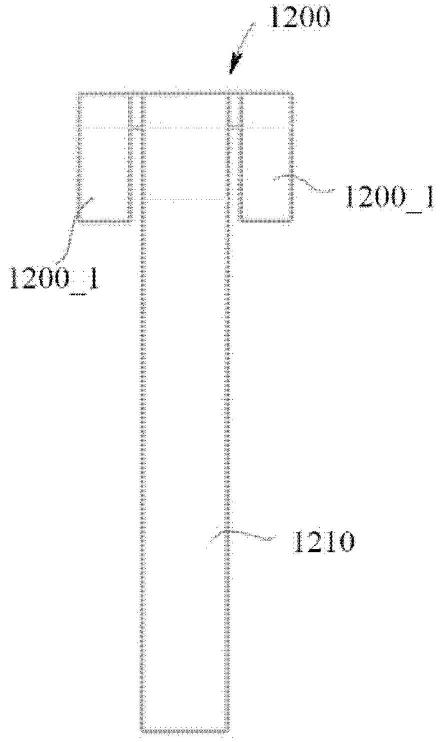
Figure 6C:
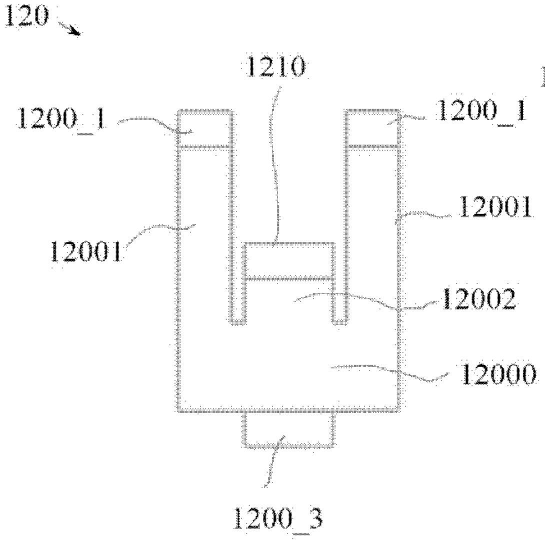
Figure 6D:
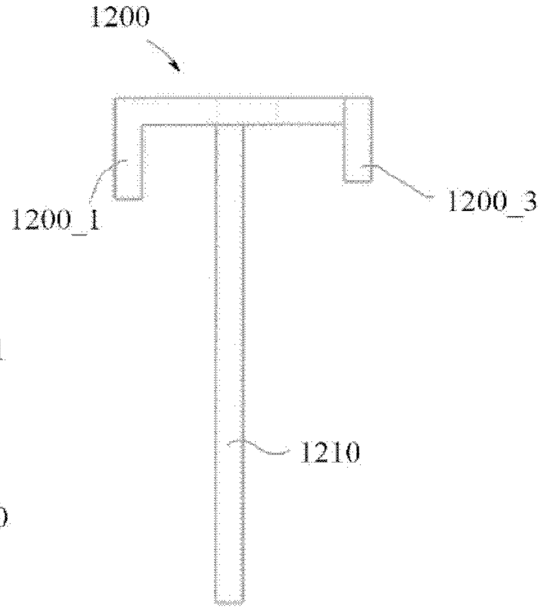
Figure 7A:
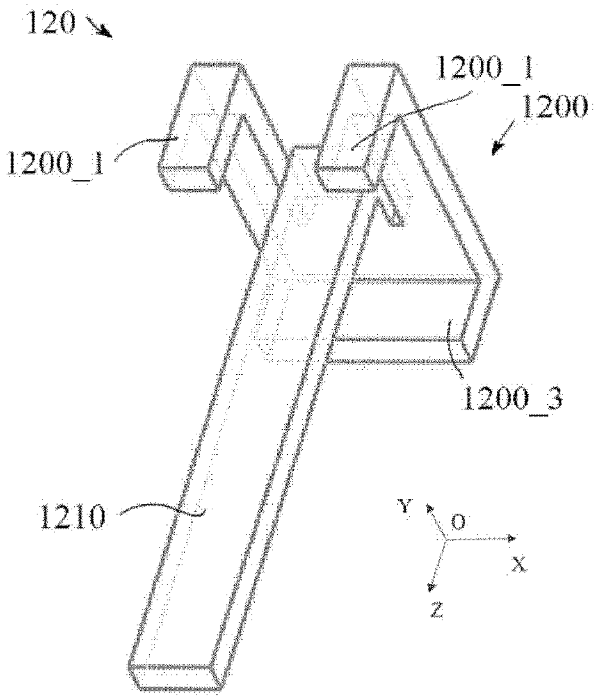
FIGS. 7A, 7B, 7C and 7D show a perspective view, a front view, a bottom view and a side view of a fifth variant of a resonance element according to the first embodiment of the present disclosure.
Figure 7B:
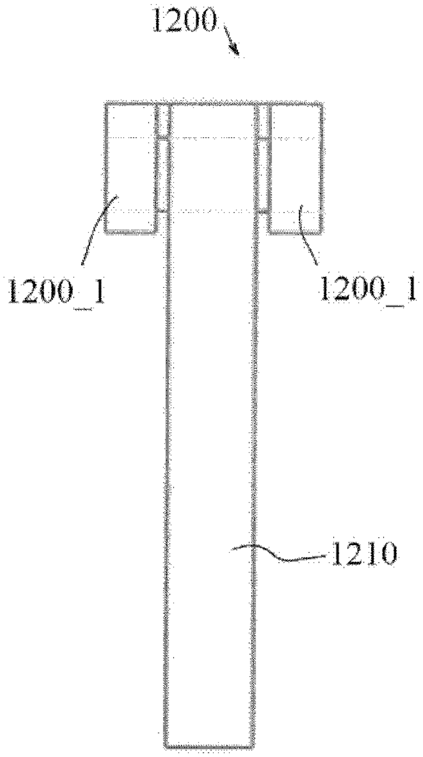
Figure 7C:
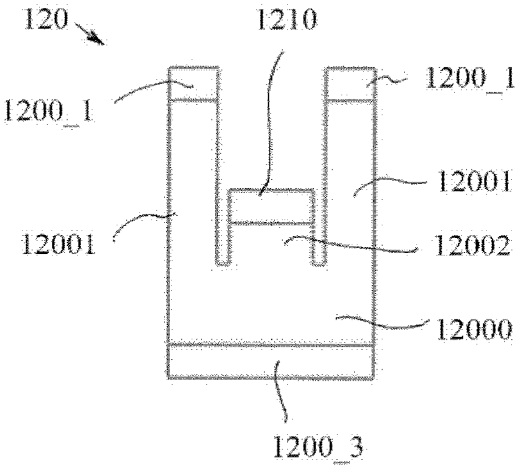
Figure 7D:
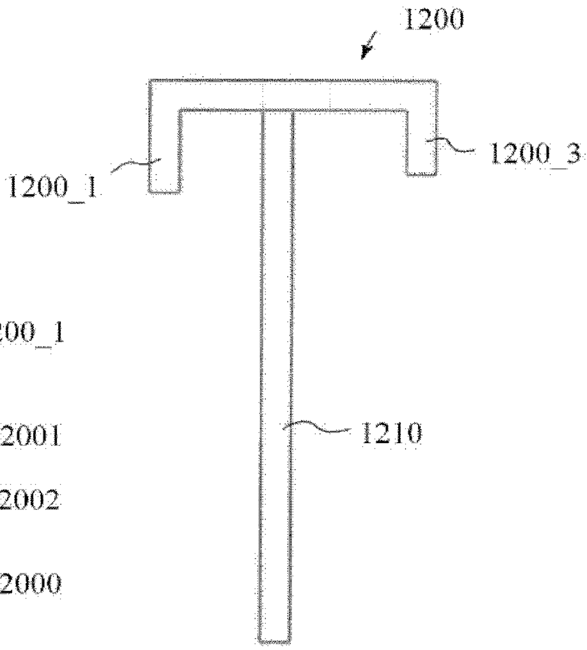
Figure 8A:
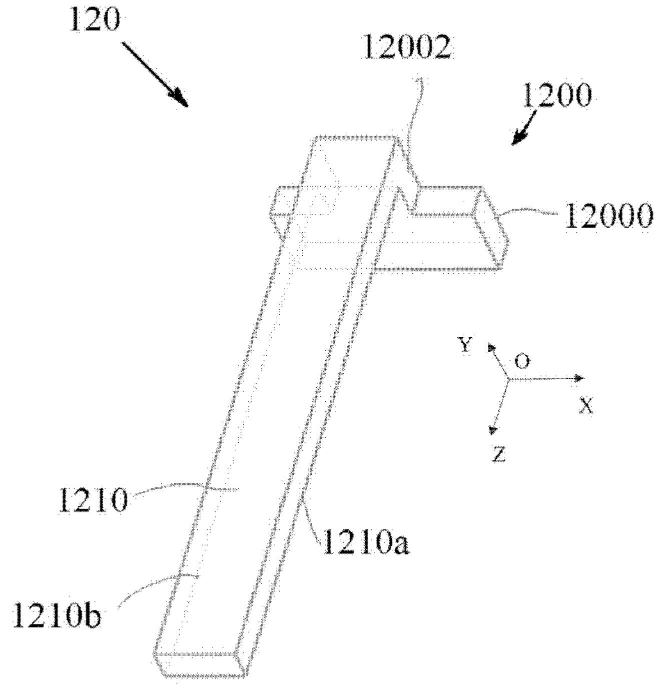
FIGS. 8A, 8B, 8C and 8D show a perspective view, a front view, a bottom view and a side view of a first variant of a resonance element according to a second embodiment of the present disclosure.
Figure 8B:
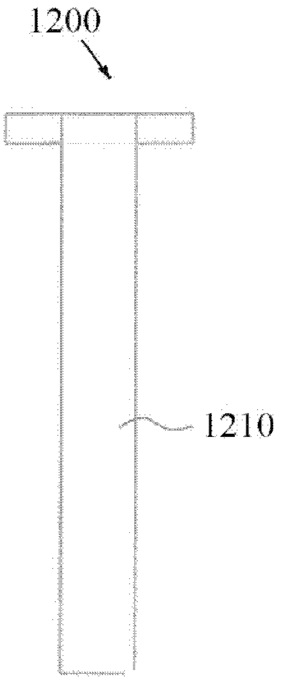
Figure 8C:
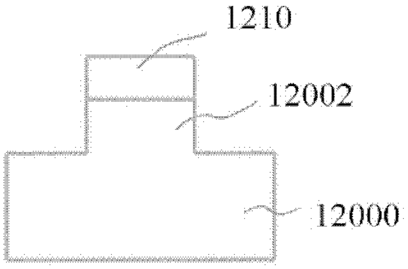
Figure 8D:
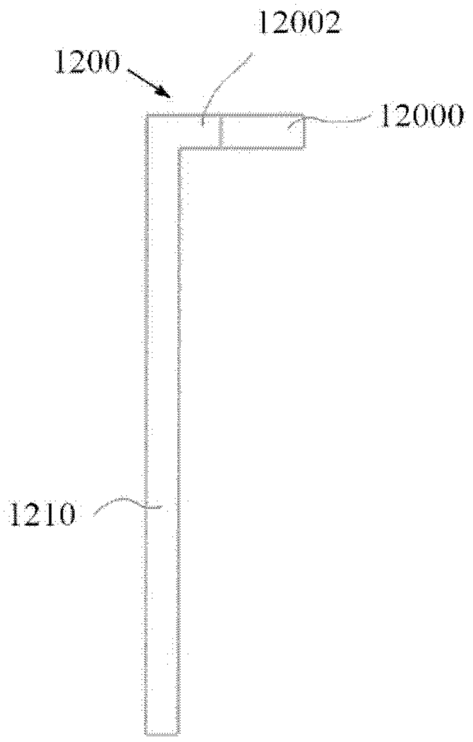
Figure 9A:
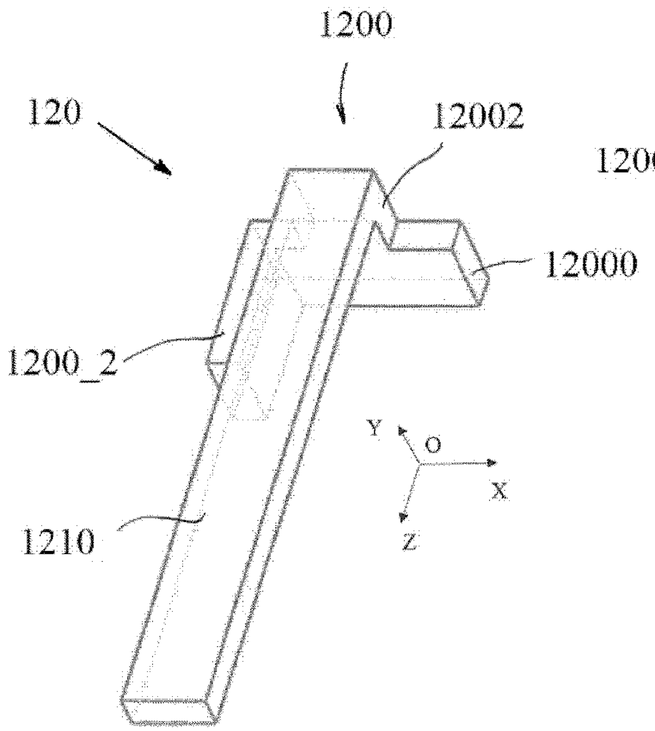
FIGS. 9A, 9B, 9C and 9D show a perspective view, a front view, a bottom view and a side view of a second variant of a resonance element according to the second embodiment of the present disclosure.
Figure 9B:
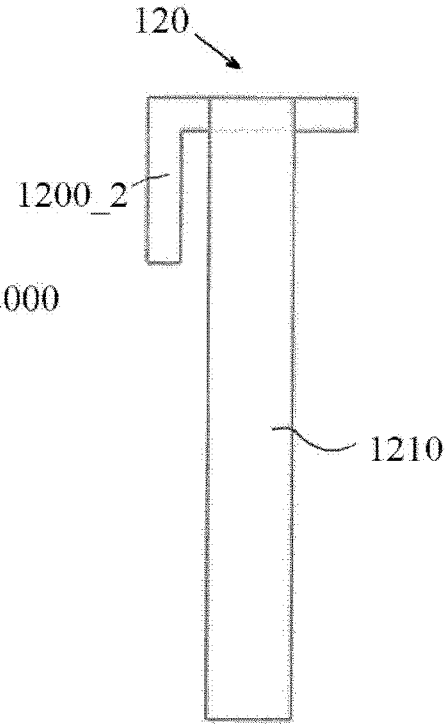
Figure 9C:
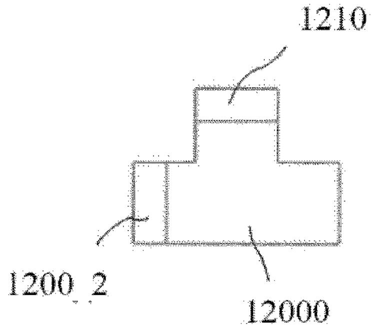
Figure 9D:
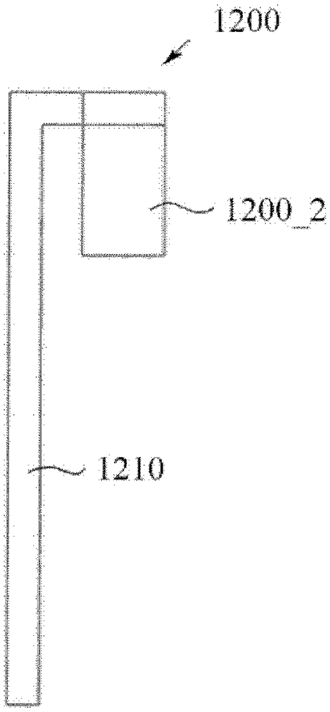
Figure 10A:
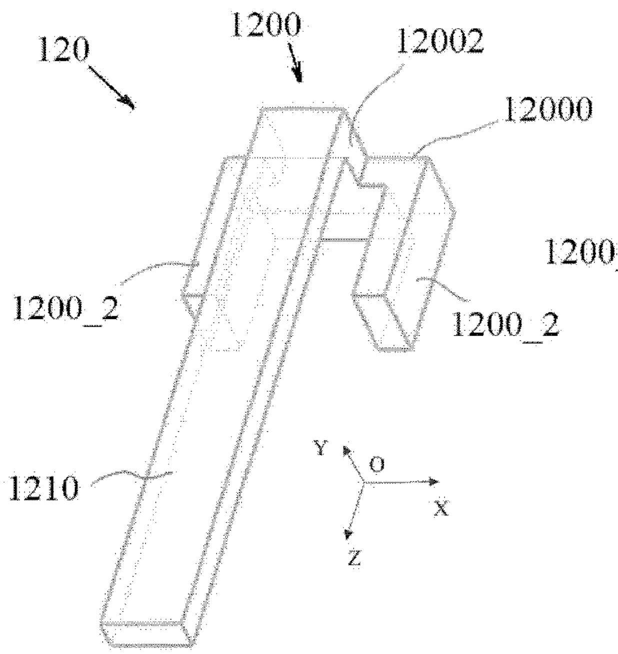
FIGS. 10A, 10B, 10C and 10D show a perspective view, a front view, a bottom view and a side view of a third variant of a resonance element according to the second embodiment of the present disclosure.
Figure 10B:
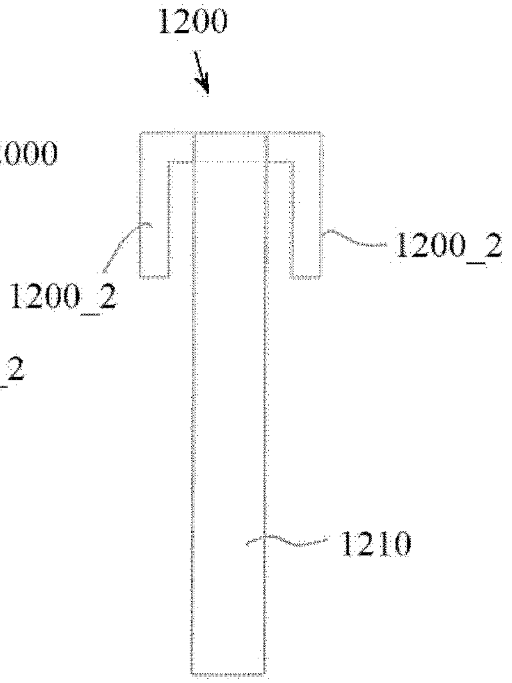
Figure 10C:
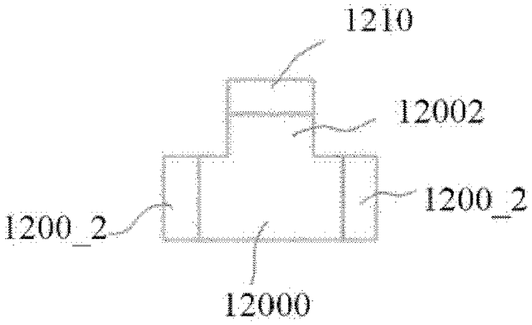
Figure 10D:
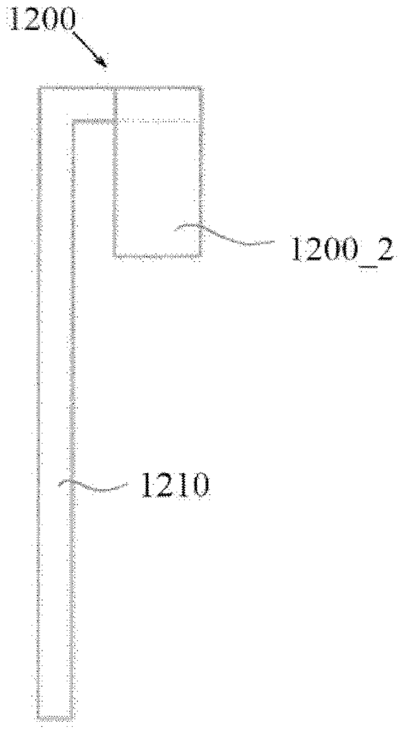
Figure 11A:
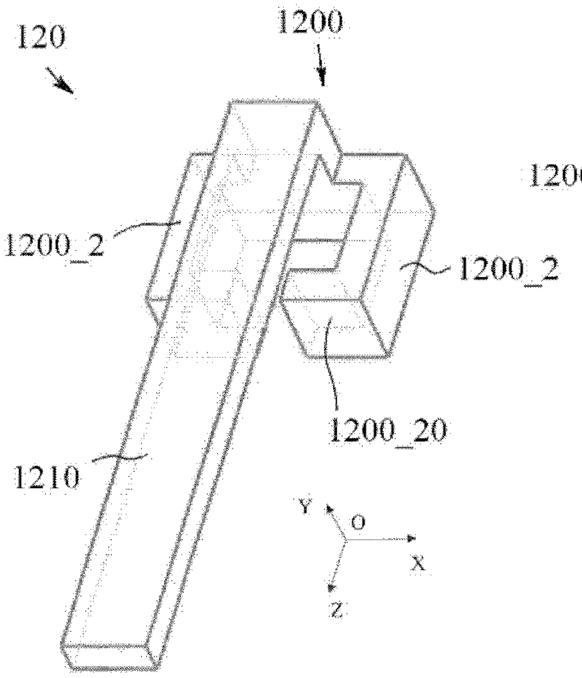
FIGS. 11A, 11B, 11C and 11D show a perspective view, a front view, a bottom view and a side view of a fourth variant of a resonance element according to the second embodiment of the present disclosure.
Figure 11B:
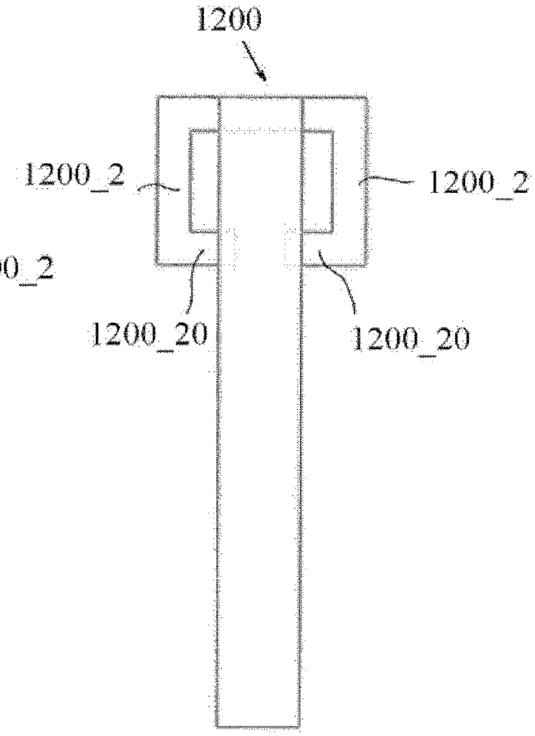
Figure 11C:
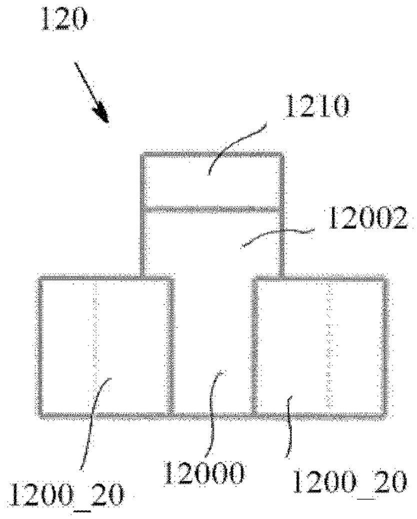
Figure 11D:
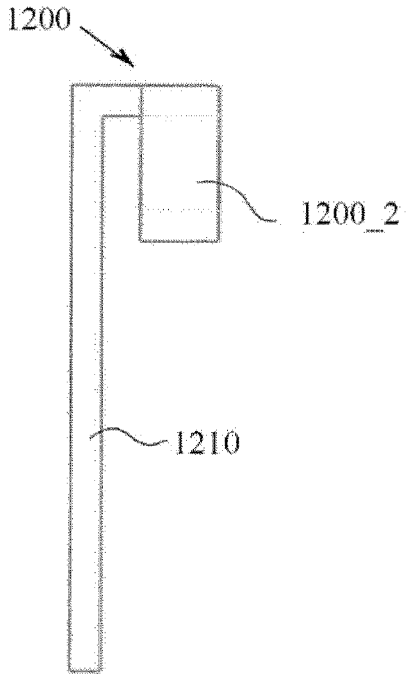
Figure 12A:
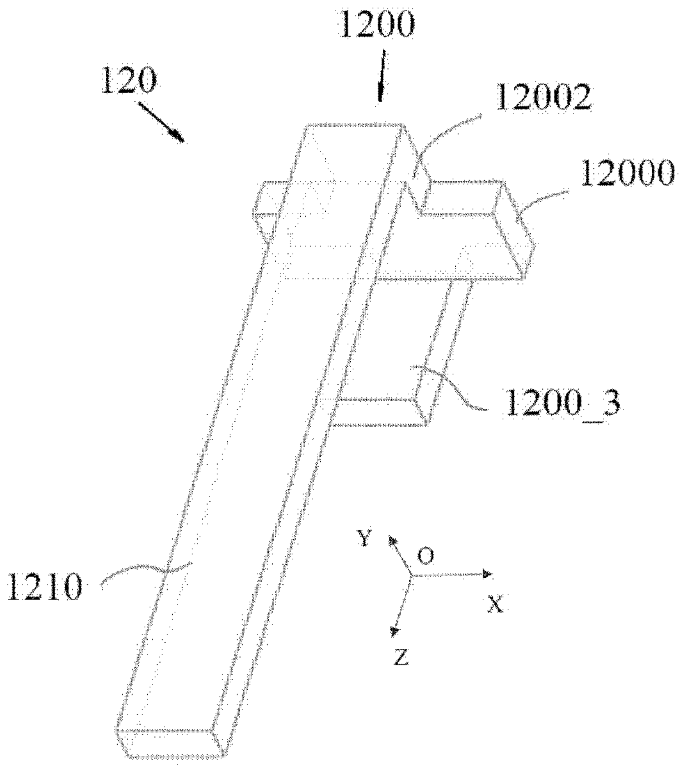
FIGS. 12A, 12B, 12C and 12D show a perspective view, a front view, a bottom view and a side view of a fifth variant of a resonance element according to the second embodiment of the present disclosure.
Figure 12B:
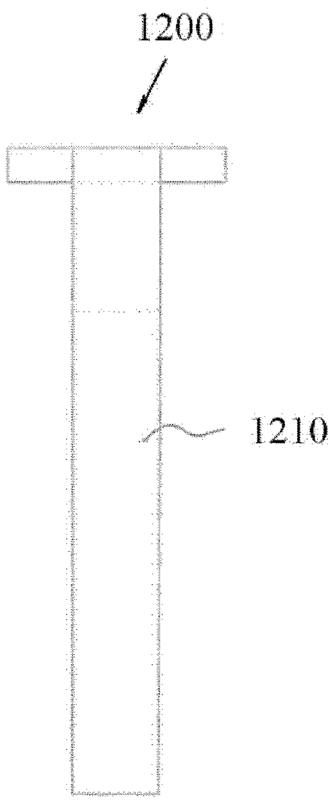
Figure 12C:
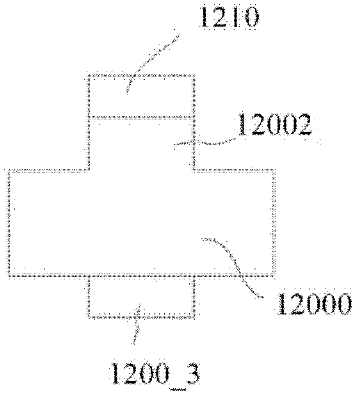
Figure 12D:
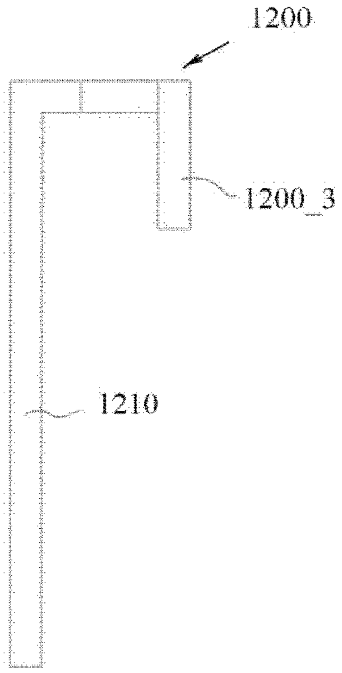
Figure 13A:
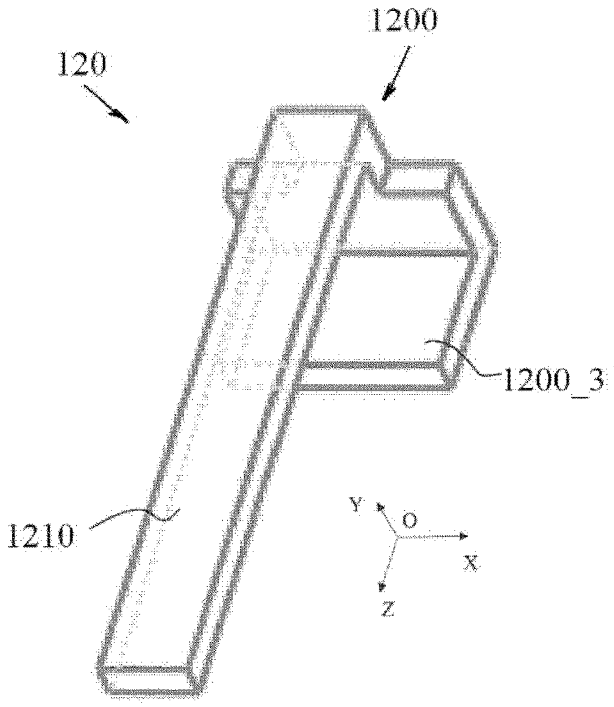
FIGS. 13A, 13B, 13C and 13D show a perspective view, a front view, a bottom view and a side view of a sixth variant of a resonance element according to the second embodiment of the present disclosure.
Figure 13B:
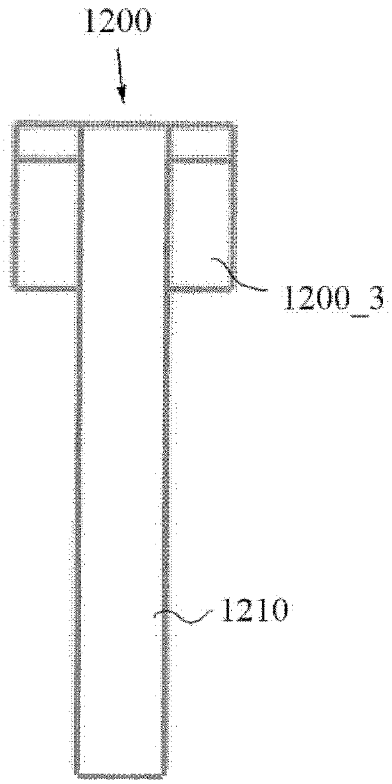
Figure 13C:
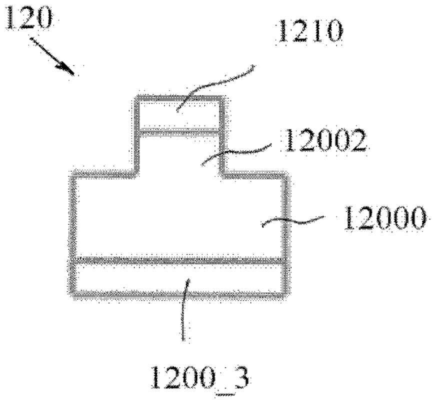
Figure 13D:
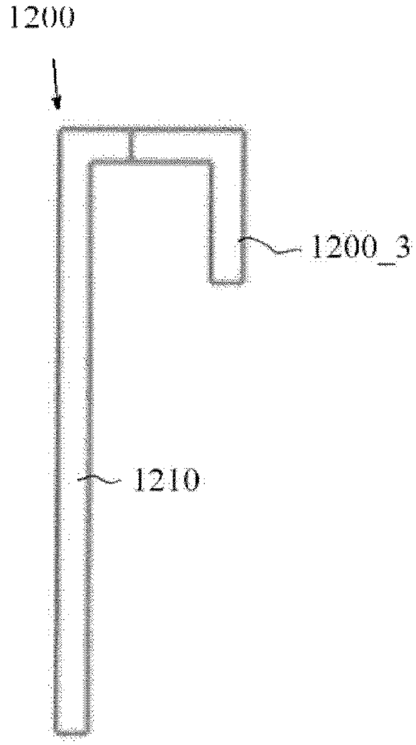
Figure 14A:
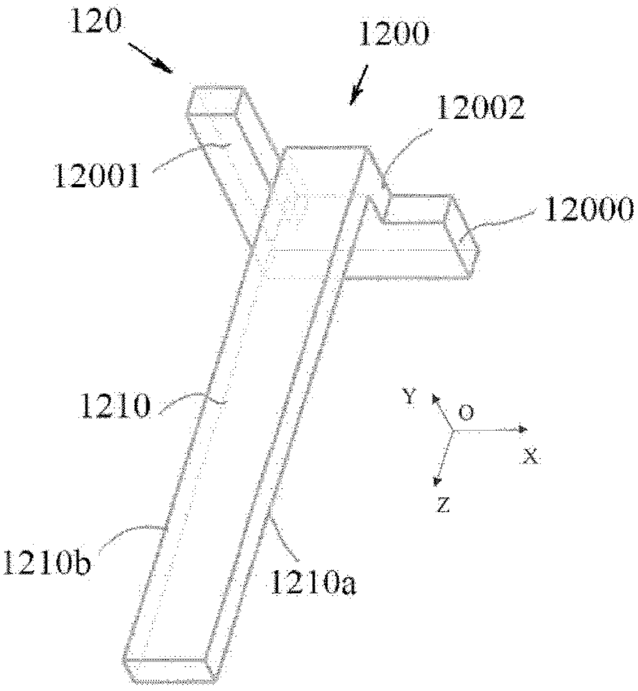
FIGS. 14A, 14B, 14C and 14D show a perspective view, a front view, a bottom view and a side view of a first variant of a resonance element according to a third embodiment of the present disclosure.
Figure 14B:
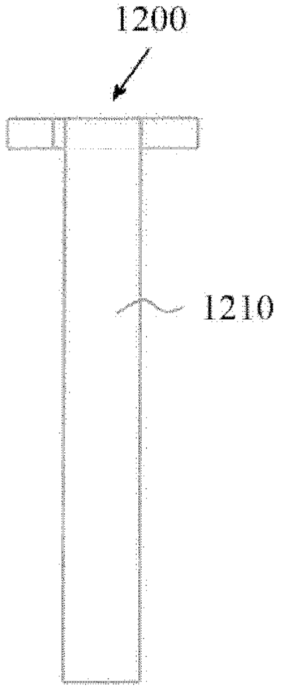
Figure 14C:
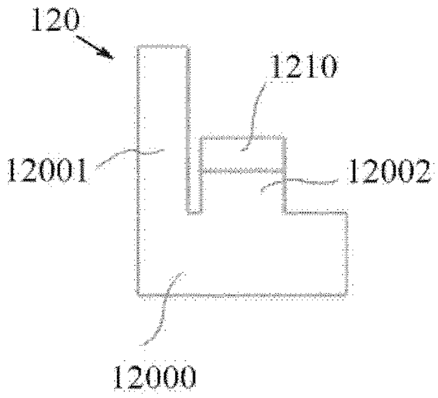
Figure 14D:
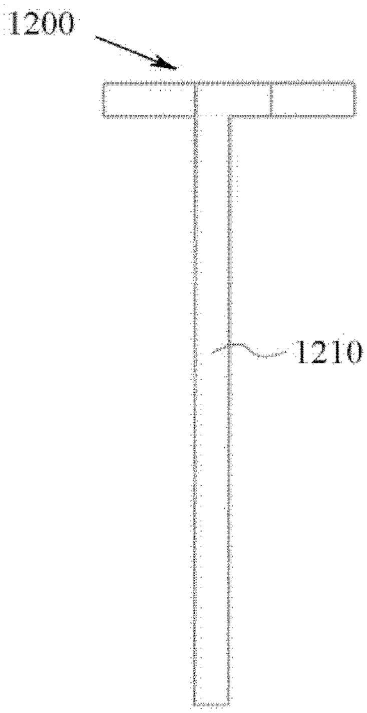

As compared with the second variant, the third variant of the resonance element 120 additionally comprises a lateral dropping planar part (a third dropping planar part) 1200_3 provided on a lateral side of the main body of the planar portion 1200 which is opposite to another lateral side from which the elongate supporting portion 1210 extends. The lateral dropping planar part 1200_3 is formed by bending corresponding part of the metal sheet on corresponding lateral side of the main body of the planar portion towards the bottom of the resonance cavity along the z direction. The lateral dropping planar part 1200_3 also provides an additional surface for coupling with a surrounding wall of the resonance cavity, allowing reducing the frequency of a single cavity where the resonance element 120 is located. In the embodiment shown in FIGS. 6A-6D, the lateral dropping planar part 1200_3 extends partially along the corresponding lateral side of the main body of the planar portion 1200. Preferably, a border area between the main body of the planar portion and the lateral dropping planar part 1200_3 is located in the midway along the lateral side edge of the main body of the planar portion. As clearly shown in FIG. 6B, the elongate supporting portion 1210 and the lateral dropping planar part 1200_3 are substantially aligned to each other along the y direction.

A Fourth Variant of the Planar Portion

As shown in FIGS. 7A-7D, the fourth variant of the planar portion 1200 has a lateral dropping planar part 1200_3 extending fully along the corresponding lateral side of the main body of the planar portion. Thus, as compared with the third variant, the fourth variant enables providing more surfaces for coupling with the surrounding wall of the resonance cavity.

Although it is shown in FIGS. 6A-6D and 7A-7D that both the leg dropping planar part(s) and lateral dropping planar part are provided in the resonance element 120, it is also possible that the resonance element may be configured to have only a lateral dropping planar part provided in one piece with the main body of the planar portion.

T-Shaped Planar Portion in a Top View

A First Variant of the Planar Portion

As shown in FIGS. 8A-8D, the planar portion 1200 of the resonance element 120 is configured to be substantially in a T shape when viewed along the z direction. Especially referring to FIG. 8C, the T shape comprises a strip-shaped head part 12000 extending in the y-o-x plane and a central leg 12002 extending along the y direction in the same y-o-x plane. The strip-shaped head part and the central leg constitute the main body of the planar portion 1200. In the embodiment shown, the section of the planar portion that is corresponding to the central leg 12002 of the T shape comes from the same metal sheet for the elongate supporting portion 1210 extending in the z direction.

A Second Variant of the Planar Portion

As shown in FIGS. 9A-9D, the planar portion 1200 has an end dropping planar part (second dropping planar part) 1200_2 provided on one end of the head part 12000 and extending in the z direction and towards the bottom of the resonance cavity. The end dropping planar part 1200_2 looks like a sheet-like vertical leg hanging from the plane of the head part of the T shape. The end dropping planar part 1200_2 is formed, for example, by bending corresponding part of the metal sheet at the end of the head part 12000 of the T shape towards the bottom of the resonance cavity. That is, the end dropping planar part 1200_2 and the elongate supporting portion 1210 extend on the same lower side of the main body of the planar portion.

Referring to FIGS. 10A-10D, the planar portion 1200 is provided with an end dropping planar part 1200_2 on each end of the head part 1200. Each end dropping planar part 1200_2 is suspended from the main body of the planar portion and extends towards the bottom of the resonance cavity along the z direction. The outward facing surfaces of the end dropping planar parts 1200_2, which extend in the y-o-z plane, function to couple with surrounding wall of the resonance cavity and thus reduce the frequency of a single cavity concerned.

A Third Variant of the Planar Portion

On the basis of the second variant, a third variant is made, comprising a folded part 1200_20 on each lower end of the end dropping planar part 1200_2, as shown in FIGS. 11A-11D. The folded part 1200_20 extends beneath and in parallel to the plane of the main body of the planar portion. When viewed along the y direction, two end dropping planar parts look like two right-angle hooks facing each other. The folded parts 1200_20 provide additional surfaces for coupling with the inner side of the cover plate on top of the resonance cavity, allowing reducing the frequency and the size of the cavity filter as well.

A Fourth Variant of the Planar Portion

Optionally or additionally, the fourth variant of the planar portion comprises a lateral dropping planar part 1200_3 provided on a lateral side of the main body of the planar portion which is opposite to another lateral side from which the elongate supporting portion 1210 extends, as shown in FIGS. 12A-12D. The lateral dropping planar part 1200_3 may be formed by bending corresponding part of the metal sheet on corresponding lateral side of the main body of the planar portion towards the bottom of the resonance cavity along the z direction. The lateral dropping planar part 1200_3 also provides an additional surface for coupling with a surrounding wall of the resonance cavity, allowing reducing the frequency of a single cavity where the resonance element is located. In the embodiment shown in FIGS.

12A-12D, the lateral dropping planar part 1200_3 extends partially along the corresponding lateral side of the main body of the planar portion.

In the embodiment shown in FIGS. 13A-13D, the lateral dropping planar part 1200_3 extends fully along the corresponding lateral side of the main body of the planar portion.

F-Shaped Planar Portion in a Top View

As shown in FIGS. 14A-14D, the planar portion 1200 of the resonance element 120 is configured to be in an F shape when viewed along the z direction. Especially referring to FIG. 14C, the F shape comprises a strip-shaped base 12000 extending in the x direction, and a side leg 12001 and a middle leg 12002 both of which extend in the y direction from the same lateral side of the strip-shaped base 1200. The strip-shaped base 12000 and the middle leg 12002 constitute the main body of the planar portion. The side leg 12001 of the F shape is located on an end of the strip-shaped base. In the embodiment shown in FIG. 14A, the section of the planar portion that is corresponding to the middle leg 12002 of the F shape comes from the same metal sheet for the elongate supporting portion 1210. That is, a strip-shaped portion of the metal sheet is bent along a line in its plane to have one segment used as the middle leg 12002 of the F shape and the other segment used as the elongate supporting portion 1210.

Although it is not shown in the drawings, it can be understood that a leg dropping planar part may be provided on the side leg of the F shape, which extends in the z direction and looks like a sheet-like vertical leg hanging from the plane of the F-shaped sheet-like main body of the planar portion. It can be formed, for example, by bending corresponding part of the metal sheet at an end of the side leg of the F shape towards the bottom of the resonance cavity.

Similar to the T-shaped planar portion, an end dropping planar part may be provided on the free end of the strip-shaped base (namely, a tail end of the F shape) which is far away from the end on which the side leg of the F shape is located. Optionally, a folded part may be provided on an end of the end dropping planar part far away from the main body of the planar portion and may extend beneath and in parallel with the plane of the main body of the planar portion.

Optionally or additionally, a lateral dropping planar part may be provided on a lateral side of the main body of the planar portion which is opposite to another lateral side from which the elongate supporting portion extends. It may also extend partially or fully along the corresponding lateral side of the main body of the planar portion.

L-Shaped Planar Portion in a Top View

As shown in FIGS. 15A-15D, the planar portion of the resonance element 120 is configured to be in an L shape when viewed along the z direction. Especially referring to FIG. 15C, the L shape comprises a strip-shaped base 12000 extending in x direction and a leg 12001 provided on the end of the strip-shaped base and extending in the y direction from a lateral side of strip-shaped base. The strip-shaped base 12000 and the leg 12001 constitute the main body of the planar portion. In the embodiment shown, the section of the planar portion that is corresponding to the leg of the F shape comes from the same metal sheet for the elongate supporting portion 1210. That is, a strip-shaped portion of the metal sheet is bent along a line in its plane to have one segment used as the leg 12001 of the L shape and the other segment used as the elongate supporting portion 1210.

According to the present disclosure, although "L" is used to describe the outline of the planar portion in a top view, the ratio of the length of the strip-shaped base 12000 to the length of the leg 12001 is not necessarily greater than 1. It may be equal to 1 or smaller than 1, depending on the case.

Figure 15A:
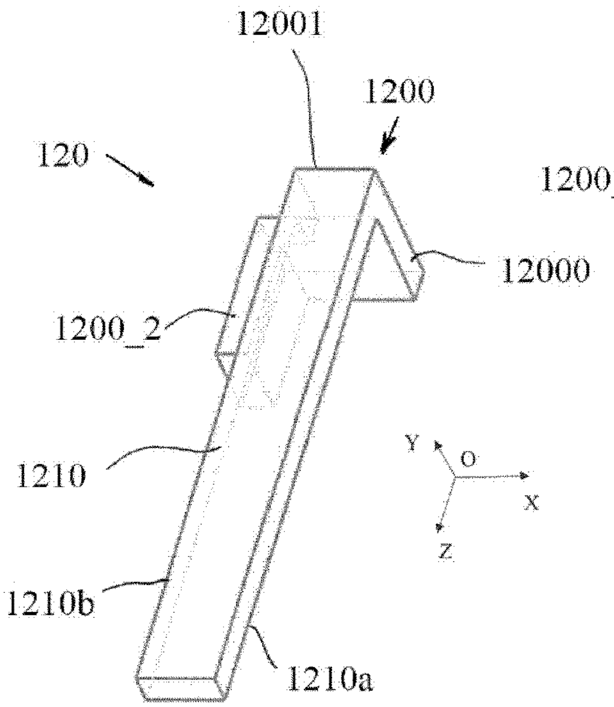
FIGS. 15A, 15B, 15C and 15D show a perspective view, a front view, a bottom view and a side view of a first variant of a resonance element according to a fourth embodiment of the present disclosure.
Figure 15B:
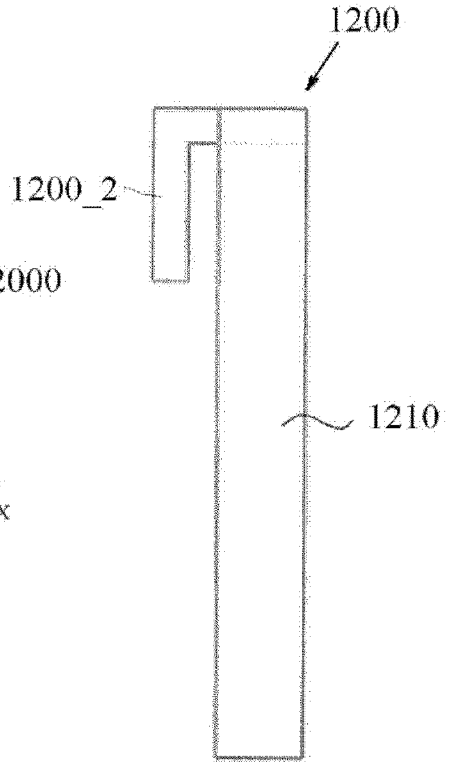
Figure 15C:
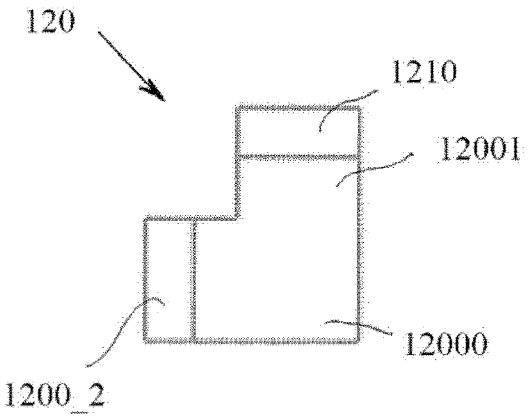
Figure 15D:
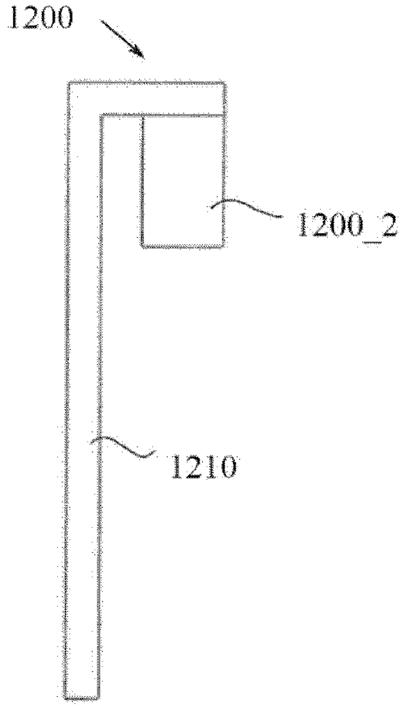

As clearly shown in FIG. 15A, the planar portion has an end dropping planar part 1200_2 provided on an end of the strip-shaped base opposite to the end from which the leg 12001 extends. The end dropping planar part 1200_2 extends in the z direction and towards the bottom of the resonance cavity. It looks like a sheet-like vertical leg hanging from the plane of the strip-shaped base of the L shape. The end dropping planar part is formed, for example, by bending corresponding part of the metal sheet at the corresponding end of the strip-shaped base of the L shape towards the bottom of the resonance cavity. The end dropping planar part and the elongate supporting portion extend on the same lower side of the main body of the planar portion.

Although it is not shown in FIG. 15A, the end dropping planar part 1200_2 may have a folded part provided at its end far away from the main body of the planar portion. The folded part extends beneath and in parallel to the plane of the main body of the planar portion. When viewed along the y direction, the end dropping planar part looks like a right-angle hook suspended from the main body of the planar portion.

Optionally or additionally, a lateral dropping planar part may be provided on a lateral side of the main body of the planar portion which is opposite to another lateral side from which the elongate supporting portion 1210 extends. With the provision of the lateral dropping planar part, an additional surface may be obtained for coupling with a surrounding wall of the resonance cavity, therefore allowing reducing the frequency of a single cavity where the resonance element is located. The lateral dropping planar part may extend partially or fully along the corresponding lateral side of the main body of the planar portion.

Elongate Supporting Portion

Referring to FIGS. 3A, 8A,14A and 15A, the elongate supporting portion 1210 has two opposite main surfaces extending in the z-o-x plane and two opposite side surfaces extending in the z-o-y plane. One main surface 1210*a* of the elongate supporting portion 1210 defines an angle area together with the lower side of the main body of the planar portion. The other main surface is an outward-facing main surface 1210*b* extending at an angle from the upper planar surface of the main body of the planar portion 1200.

In the cavity filter provided with the resonance element according to the present disclosure, the outward-facing main surface 1210*b* of the elongate supporting portion 1210 may function as a tuning surface cooperating with a tuning screw inserted into a region in proximity to or partially surrounded by the outward-facing main surface of the elongate supporting portion 1210. Preferably, the tuning screw protrudes from the top along a vertical line which is substantially located in a vertical symmetrical plane of the elongate supporting portion 1210.

Particularly, for a resonance element with a planar portion in an E shape, the tuning screw may extend into a recessed region defined by the side legs of the E shape and outward-facing main surface of the elongate supporting portion. In this configuration, the surfaces of the side legs which face the interior of the recessed region allows providing more tuning surfaces for cooperating with the tuning screw, increasing the sensitivity in terms of tuning.

For all the resonance elements with planar portions according to the above variants, the outward-facing main surface 1210*b* of the elongate supporting portion 1210 is used as a main tuning surface cooperating with the tuning screw.

One-Piece Resonance Member

As can be seen from FIGS. 16A-16D and 17A-17D, one resonance member 12 may comprise two or more resonance elements 120 arranged in a line. The resonance elements 120 are connected into one piece by a common planar connection bar 121 from which the elongate supporting portions of the resonance elements protrude integrally. The common planar connection bar 121 and the resonance elements 120 are formed by a sheet metal processing method, for example, bending or stamping, one and single metal sheet. In the preferable embodiment shown in FIGS. 16A and 17A, the common planar connection bar 121 extends in the same plane of the elongate supporting portions 1210 of the resonance elements 120.

Figure 16A:
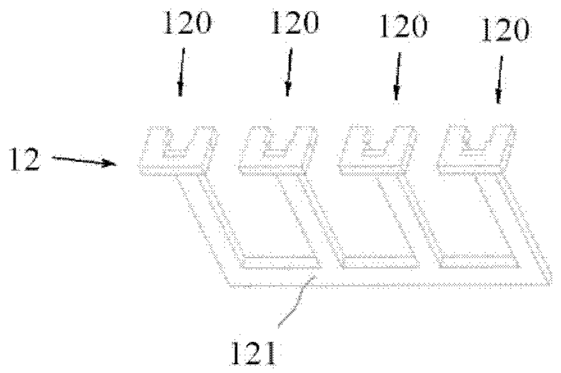
FIGS. 16A, 16B, 16C and 16D show a perspective view, a top view, a back view and a side view of a first variant of a resonance member according to the present disclosure.
Figure 16B:
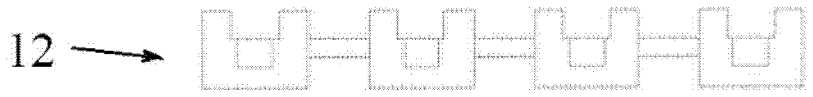
Figure 16C:
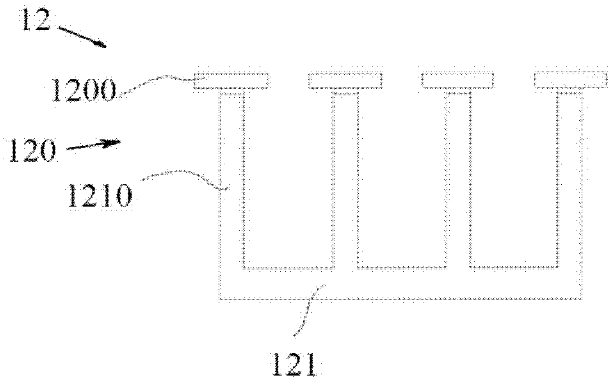
Figure 16D:
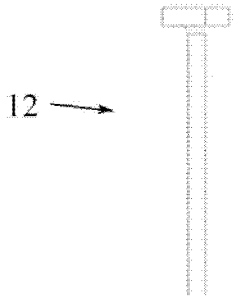
Figure 17A:
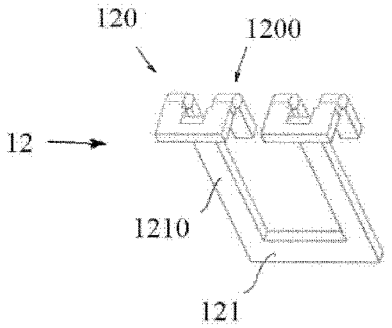
FIGS. 17A, 17B, 17C and 17D show a perspective view, a bottom view, a front view and a side view of a second variant of a resonance member according to the present disclosure.
Figure 17B:
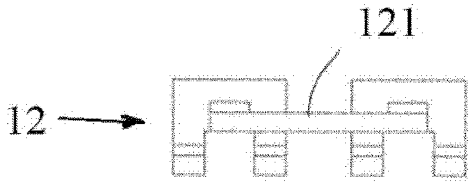
Figure 17C:
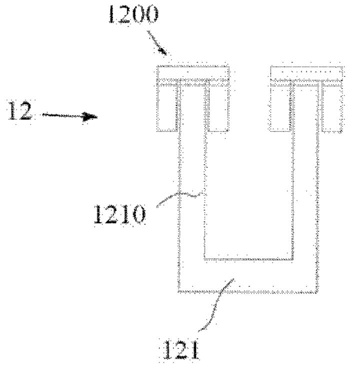
Figure 17D:
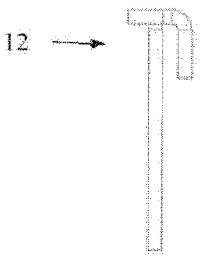

Also, it is shown in FIGS. 16B and 17B that, the resonance elements 120 in a resonance member 12 have outlines in the E shape when viewed in a direction perpendicular to the plane(s) of the main body of the planar portions 1200. All the E-shaped outlines are oriented in the same direction. It can be understood that for the resonance elements 120 in a resonance member 12, their planar portions 1200 may be designed to have outlines in different shapes according to practical needs. For example, some of the resonance elements may be configured in an E shape and others may be in a T shape. According to the present disclosure, in order to meet the specific requirement in terms of tuning, the leg dropping planar part on side legs of E and F shapes, the end dropping planar part on free end of the strip-shaped base of the F shape and the L shape and the lateral dropping planar part on the lateral side of the main body of the E, F, L and T shapes can be taken into account as well when designing the resonance elements 120. For example, as shown in FIG. 17A, the planar portions of the E-shaped resonance elements in the resonance member each comprise leg dropping planar parts on ends of the side legs of the E shape.

Although it is shown that one single resonance member comprises two or four resonance elements, it can be understood that the number of resonance elements in one single resonance member may vary from case to case.

Both the resonance elements and the resonance members can be formed into one piece from a metal sheet by means of a sheet metal processing method, for example, bending or stamping. Therefore, they can go into a mass production with high efficiency and reduced cost. Furthermore, the resonance elements and the resonance members according to the present disclosure allow to provide planar portions having surface area as large as possible and thus enable reducing the size of the cavity filter while improving the flexibility in terms of tuning.

Hereinbelow, the terms "top", "bottom", "up" and "lower" are introduced just for the sake of describing the relative positions of parts when the resonance elements or resonance members are placed in a manner as shown in FIGS. 1 and 2. None of them should be interpreted as limitative for the arrangement of the resonance elements or resonance members in a cavity filter.

References in the present disclosure to "an embodiment", "another embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A resonance element for a cavity filter, the resonance element made of a metal sheet and comprising a planar portion to be positioned facing a first inner side of a resonance cavity of the cavity filter and an elongate supporting portion extending from the planar portion towards the second inner side of the resonance cavity opposite to the first inner side and connected therewith in a grounding state, wherein the planar portion is configured to be substantially in an E-shape, an F-shape, an L-shape or a T-shape when viewed along a direction perpendicular to a plane of the planar portion;

wherein the resonance element is bent from the metal sheet along a line in its plane to have the planar portion and the elongate supporting portion;

wherein a middle leg of the E shape, a middle leg of the F shape, a leg of the L shape or a central leg of the T shape and the elongate supporting portion come from a strip-shaped portion of the metal sheet.

2. The resonance element according to claim 1, wherein at least one side leg of the E shape has a first dropping planar part extending towards the second inner side of the resonance cavity.

3. The resonance element according to claim 2, wherein the first dropping planar part is formed by bending corresponding part of the metal sheet at an end of corresponding side leg of the E shape.

4. The resonance element according to claim 1, wherein a side leg of the F shape has a first dropping planar part extending towards the second inner side of the resonance cavity.

5. The resonance element according to claim 4, wherein the first dropping planar part is formed by bending corresponding part of the metal sheet at an end of the side leg of the F shape.

6. The resonance element according to claim 1, wherein a tail end of the F shape has a second dropping planar part extending towards the second inner side of the resonance cavity.

7. The resonance element according to claim 6, wherein the second dropping planar part is formed by bending corresponding part of the metal sheet at the tail end of the F shape.

8. The resonance element according to claim 6, wherein a folded part is provided at an end of the second dropping planar part far away from a main body of the planar portion and extends beneath and parallel to a plane of the main body of the planar portion.

9. The resonance element according to claim 8, wherein the folded part is formed by bending corresponding part of the metal sheet at corresponding end of the second dropping planar part.

10. The resonance element according to claim 1, wherein a strip-shaped base of the L shape has a second dropping planar part provided at its end away from the elongate supporting portion and extending towards the second inner side of the resonance cavity.

11. The resonance element according to claim 10, wherein the second dropping planar part is formed by bending corresponding part of the metal sheet at corresponding end of the strip-shaped base of the L shape.

12. The resonance element according to claim 1, wherein at least one end of a head part of the T shape has a second dropping planar part extending towards the second inner side of the resonance cavity.

13. The resonance element according to claim 12, wherein the second dropping planar part is formed by bending corresponding part at corresponding end of the head part of the T shape.

14. The resonance element according to claim 1, wherein the planar portion has a third dropping planar part extending on a lateral side of a main body of the planar portion opposite to another lateral side from which the elongate supporting portion extends, towards the second inner side of the resonance cavity.

15. The resonance element according to claim 14, wherein the third dropping planar part is formed by bending corresponding part of the metal sheet on corresponding lateral side of the main body of the planar portion.

16. The resonance element according to claim 14, wherein the third dropping planar part extends partially or fully along the corresponding lateral side of main body of the planar portion.

17. A one-piece resonance member made from a metal sheet, comprising at least two resonance elements, wherein the at least two resonance elements are made from one and the same metal sheet and are connected in a row via a common planar connection bar which is formed from the same metal sheet and extends in the same plane as the elongate supporting portions of the resonance elements;

wherein at least one of the at least two resonance elements comprises: a planar portion configured to be substantially in an E-shape, an F-shape, an L-shape or a T-shape when viewed along a direction perpendicular to a plane of the planar portion;

wherein the at least one of the at least two resonance elements is bent from the metal sheet along a line in its plane to have the planar portion and the elongate supporting portion;

wherein a middle leg of the E shape, a middle leg of the F shape, a leg of the L shape or a central leg of the T shape and the elongate supporting portion come from a strip-shaped portion of the metal sheet.

* * * * *